United States Patent [19]
Thompson

[11] Patent Number: 5,392,404
[45] Date of Patent: Feb. 21, 1995

[54] BUS CONTROL PREEMPTION LOGIC

[75] Inventor: Stephen P. Thompson, Delray Beach, Fla.

[73] Assignee: International Business Machines Corp., Armonk, N.Y.

[21] Appl. No.: 903,059

[22] Filed: Jun. 22, 1992

[51] Int. Cl.6 ............................................. G06F 13/00
[52] U.S. Cl. ................................. 395/275; 364/242.6; 364/242.93; 364/DIG. 1
[58] Field of Search ................ 395/200, 275, 325, 425

[56] References Cited

U.S. PATENT DOCUMENTS 4,787,082 11/1988 Delaney ............................... 370/85
5,163,143 11/1992 Culley et al. ....................... 395/425

FOREIGN PATENT DOCUMENTS 3105655 5/1991 Japan .

*Primary Examiner*—Robert L. Richardson
*Attorney, Agent, or Firm*—Calfee Halter & Griswold

[57] ABSTRACT

A method and system for monitoring and controlling access to a system bus in a computer system is provided. The system devices include a central processing unit, a memory controller for controlling access to system memory, and at least first and second input/output devices each having a coprocessor incorporated therein. The system bus electrically interconnects the system devices and system memory. Any one of the system devices may serve as a bus master of the system bus at any one time when communicating over the bus with each other or with system memory. In addition, the memory controller may serve as a bus master on behalf of a slave device requesting access to the system bus. The input/output devices have control logic incorporated therein for (i) determining when an alternate input/output device requests control of the bus, (ii) outputting a preemption signal in response to the alternate request, and (iii) relinquishing control of the bus in response to the preemption signal.

20 Claims, 5 Drawing Sheets

BUS CONTROL PREEMPTION LOGIC

FIELD OF THE INVENTION

The present invention relates generally to computer system architecture, and more specifically to preemption logic which prompts a bus master device presently in control of a system bus to relinquish control to an alternate bus master device requesting access to the bus.

BACKGROUND OF THE INVENTION

Generally in computer systems and especially in personal computer systems, data is transferred between various system devices such as the central processing unit (CPU), memory devices, and direct memory access (DMA) controllers. In addition, data may be transferred between expansion elements such as input/output (I/O) devices, and between these I/O devices and the various system devices. The I/O devices communicate with the system devices and amongst each other over computer buses, which comprise a series of conductors along which information is transmitted from any of several sources to any of several destinations. Many of the system devices and the I/O devices are capable of serving as bus masters which can control operations occurring over the computer bus.

Personal computer systems typically are architected in a single bus or dual bus configuration. In a dual bus system, bus masters may operate simultaneously on both buses. In a single bus configuration, however, only one bus master may control the system bus at a given instant in time, because simultaneous activity on the bus is prohibited. Accordingly, efficient use of the system bus by both system devices and I/O devices is an important consideration in the overall system design.

During normal operation of a single bus computer system, both the CPU and the various I/O devices capable of operating as bus masters compete for control of the single system bus. Typically, DMA channels handle arbitration between the CPU and the various I/O devices. Once a bus master obtains control of the bus, however, the time during which it can maintain exclusive control of the bus is not limited. Thus, the bus master currently in control of the bus has no way of determining whether it may retain control of the bus or whether it should relinquish control of the bus. As a result, system performance may be diminished by inefficient control of the bus.

For some system devices, if a system bus control request is not granted within a specific time period, data underruns and overruns may occur. Thus, data may be lost if a bus control request by a second I/O device is ignored while a first I/O device maintains control of the bus to perform a time consuming operation. To complicate matters further, bus control request lines are often able to float to a high logic level, thereby erroneously indicating that the second I/O device has requested access to the system bus when it actually has not.

It is an object of the present invention, then, to provide preemption control logic which recognizes system bus control requests made by a second bus master device while a first bus master device is in control of the bus, and prompts the first bus master device to relinquish control of the bus to the second bus master device, thereby insuring efficient and effective data transfer over the system bus. It is a further object of the present invention to prevent erroneous signals indicating that an I/O device has requested control of the system bus.

SUMMARY OF THE INVENTION

According to the present invention, bus control preemption logic is provided for a single bus computer system. The system includes devices able to communicate with each other over a system bus which comprises a local processor bus and an input output (I/O) bus. The local processor bus supports a central processing unit (CPU) and system memory, and the i/O bus supports a direct memory access (DMA) controller and any of a number of I/O devices which may serve as system bus masters. The preemption logic prompts a bus master device presently in control of the system bus to relinquish control to an alternate bus master device requesting access to the bus.

The local processor bus and the I/O bus are electrically connected to each other by a bus to bus converter, which provides the means by which system devices such as the CPU may communicate with the DMA controller or the I/O devices, or by which the DMA controller or the I/O devices may communicate with the CPU or with system memory. Because the local processor bus and the I/O bus communicate using the same logic, these two buses effectively form the single system bus, control of which may be given to only one bus master at any given time. The devices in the system which are capable of serving as bus masters to thereby control data transfer over the system bus include the CPU, the DMA controller, and any of the I/O devices having a coprocessor.

When more than one I/O device competes for access to the system bus, the DMA controller arbitrates between the competing devices to determine which device gains access to the system bus. Often, while a particular I/O device is operating as a bus master of the system bus, another I/O device will request access to the system bus through the DMA controller. The bus control preemption logic of the present invention, which is incorporated into each of the I/O devices in the system capable of serving as a bus master, provides the means by which a particular I/O device in control of the system bus is notified of such a request by an alternate I/O device to gain access to the bus. The bus control preemption logic also provides the means by which the I/O device in control of the system bus relinquishes control of the system bus to an alternate I/O device in response to the bus access request by the alternate I/O device.

The DMA controller is provided with eight arbitration lines, each of which is able to support an I/O device having a coprocessor and being capable of controlling the system bus. Each I/O device is assigned to a particular arbitration line. Each of the eight arbitration lines is used as an input to the bus control preemption logic. In response to an active arbitration line, which is caused by a bus access request by an alternate I/O device, the bus control logic issues a PREEMPT signal. An active PREEMPT signal indicates to the I/O device into which the control logic is incorporated that an alternate I/O device has requested access to the system bus. If the I/O device so notified is currently in control of the system bus, it is instructed to relinquish the bus to the requesting I/O device, either immediately or according to a predetermined timed sequence.

DETAILED DESCRIPTION OF THE PREFERRED EMBODIMENT

Figure 1:
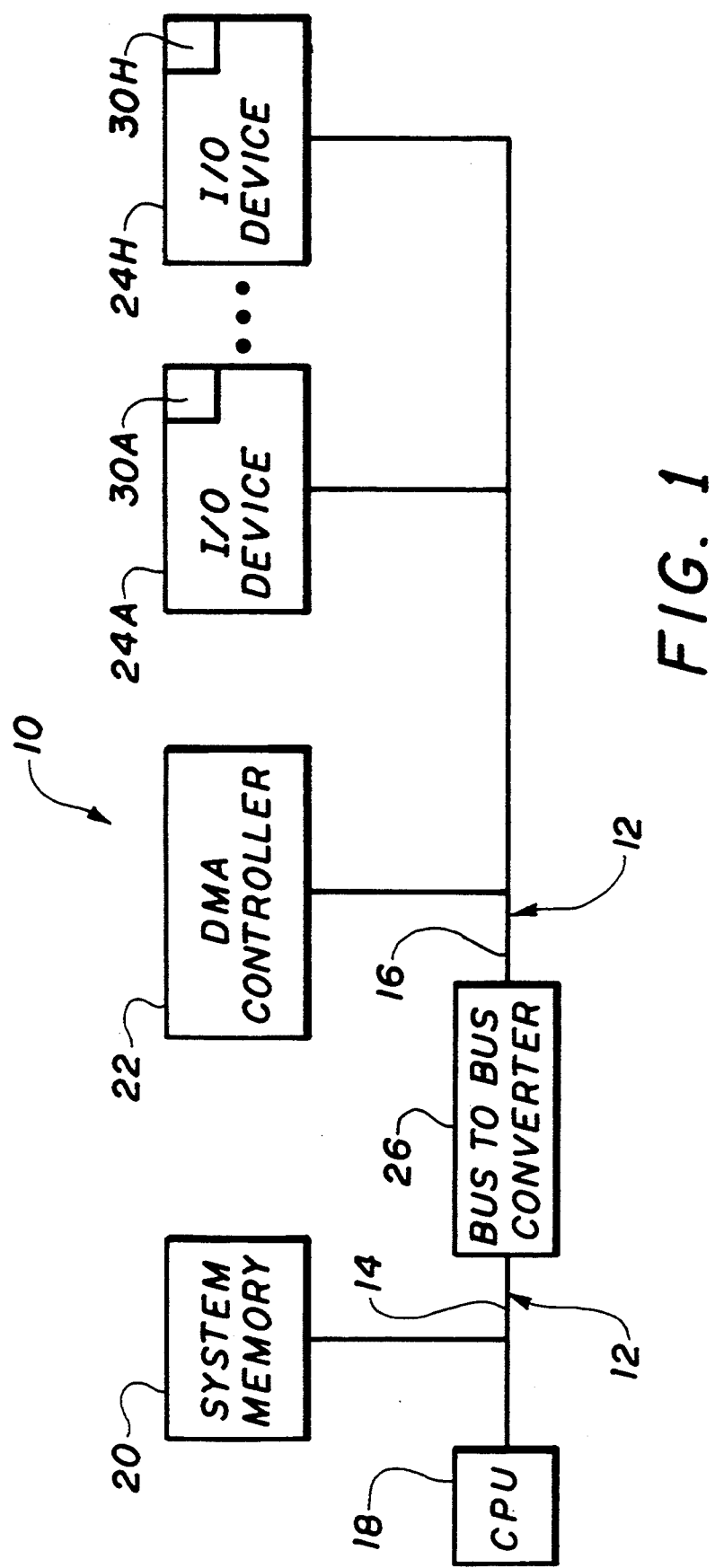
FIG. 1 is a schematic block diagram of a computer system incorporating preemption logic constructed according to the principles of the present invention.

Referring now to the drawings, FIG. 1 shows a computer system 10 which utilizes the preemption scheme of the present invention. The computer system 10 includes devices which communicate with each other over a system bus 12. The system bus 12 consists of a local processor bus 14 and an input output (I/O) bus 16. The system bus 12 in the preferred embodiment is the IBM AT bus, but applications of the present invention are contemplated for other computer buses.

The local processor bus 14 supports a central processing unit (CPU) 18 and system memory 20. The I/O bus 16 supports a direct memory access (DMA) controller 22 and any of a number of I/O devices 24A-24H which may serve as system bus masters. The DMA controller 22 controls the interchange of information between the system memory 20 and expansion memory which may reside on any of the I/O devices 24A-24H. The DMA controller may also serve as a bus master on behalf of a slave device (not shown) requesting access to the system bus.

The local processor bus 14 and the I/O bus 16 are electrically connected to each other by a bus to bus converter 26. The bus to bus converter 26 provides the means by which system devices such as the CPU 18 may communicate with the DMA controller 22 or the I/O devices 24A-24H, or by which the DMA controller 22 or the I/O devices 24A-24H may communicate with the CPU 18 or with system memory 20. Because the local processor bus 14 and the I/O bus 16 communicate using the same logic, these two buses effectively form the single system bus 12, control of which may be given to only one bus master at any given time.

The devices in the system 10 which are capable of serving as bus masters to thereby control data transfer over the system bus include the CPU 18, the DMA controller 22, and any of the I/O devices 24A-24H having a coprocessor. I/O devices will typically operate as bus masters when the target address of a source or destination operand is in system memory rather than local memory. The CPU will serve as a bus master when it must periodically perform functions within the system, such as servicing timing interrupts.

The CPU 18 gains access to the system bus 12 by default when none of the I/O devices requests access to the system bus 12. When more than one I/O device competes for access to the system bus 12, the DMA controller 22 arbitrates between the competing devices to determine which device gains access to the system bus 12. Often, while a particular I/O device is operating as a bus master of the system bus, another I/O device will request access to the system bus through the DMA controller.

The present invention provides control logic 30 by which a particular I/O device in control of the system bus 12 is notified of such a request by an alternate I/O device to gain access to the bus. The control logic 30 is incorporated into each of the I/O devices 24A-24H in the system capable of serving as a bus master. The control logic 30 also provides the means by which the I/O device in control of the system bus relinquishes control of the system bus to an alternate I/O device in response to the bus access request by the alternate I/O device, as will be described below.

Figure 2:
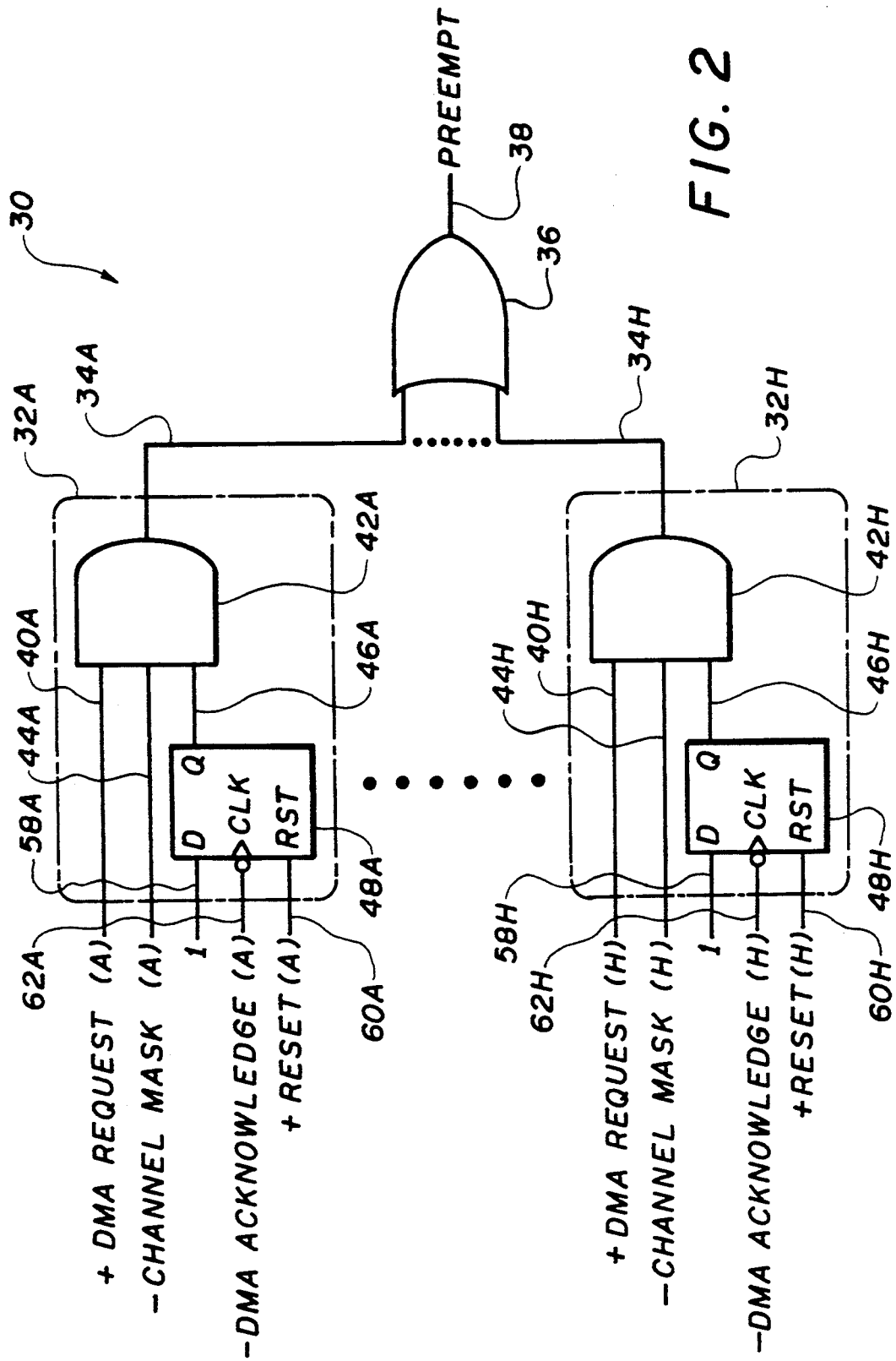
FIG. 2 is a circuit diagram used to implement the preemption logic of FIG. 1.

A circuit diagram implementing the control logic 30 of the present invention is shown in FIG. 2. As shown in FIG. 2, the control logic 30 comprises eight logic channels 32A-32H, the corresponding outputs 34A-34H of which are used as inputs to OR gate 36. The construction of each of the eight logic channels 32A-32H is identical to the individual construction as shown in 32A and 32H in FIG. 2.

For any I/O device 24A-24H, when any of the channel outputs 34A-34H are active high, the OR gate 36 outputs a PREEMPT signal 38 to the I/O device on which the control logic 30 is implemented. An active PREEMPT signal 38 notifies the I/O device into which the control logic 30 is incorporated that an alternate I/O device has requested access to the system bus. If the I/O device so notified is currently in control of the system bus 12, the I/O device is instructed to relinquish the bus to the requesting I/O device.

As explained above, the DMA controller 22 arbitrates between the competing I/O devices to determine which device ultimately gains access to the system bus 12. The DMA controller 22 is provided with eight arbitration lines 40A-40H, each of which is capable of supporting an I/O device having a coprocessor capable of controlling the system bus 12. Because only one of the I/O devices 24A-24H, the CPU 18 or the DMA controller 22 may serve as system bus master at any one time, the DMA controller 22 operates as an arbiter of which device ultimately gains access to the system bus 12 to serve as system bus master.

The eight arbitration channels are shown in FIG. 2 as +DMA REQUEST(A) through +DMAREQUEST(H). Each I/O device is assigned to a particular arbitration channel. The arbitration channels are assigned a predetermined priority to determine the priority of access which a particular I/O device has to the system bus 12. In the preferred embodiment, which corresponds to the IBM AT bus architecture, channel A has highest priority and channel H has the lowest priority.

As shown by the circuit of FIG. 2, a PREEMPT signal 38 will result at any time during which any one of outputs 34A-34N of the logic channels 32A-32N is driven active high by a corresponding AND gate 42. This situation will occur for a given logic channel 32A-32H when (i) the +DMA REQUEST line 40 is active high, (ii) a −CHANNEL MASK input 44 is inactive high, indicating that the channel is not masked but is instead enabled, and (iii) the Q output 46 of D-type flip-flop 48 is active high. When all three of the above conditions are met, the PREEMPT signal 38 is driven active high, indicating to any I/O device currently in control of the system bus 12 that another I/O device has requested access to the bus and that the controlling I/O device must relinquish control of the bus to the requesting device.

The +DMA REQUEST line 40 is driven active high when an I/O device capable of operating as a system bus master requests access to the bus through the DMA controller 22 by means of the particular +DMA REQUEST line 40 assigned to it. Each I/O bus master device in the system 10 is assigned one particular line 40A–40H, depending on the bus priority access which is desired for that particular device. The −CHANNEL MASK inputs 44A–44H are normally inactive high, a condition which enables each of the logic channels 32A–32H to permit a PREEMPT condition.

Provisions must be made to disable a particular logic channel 32A–32H, however, in order to prevent an I/O device presently controlling the system bus 12 from preempting itself off of the bus. For example, if an I/O device 24 is assigned to DMA REQUEST line 40A, the −CHANNEL MASK line 44A must be active (low) for logic channel 34A in the control logic 30 which is incorporated into that device. By activating (forcing low) this input, a PREEMPT signal 38 will not result if that I/O device, while in control of the system bus 12, issues a subsequent +DMA REQUEST(A) to the DMA controller 22. Thus, the I/O device will not be falsely notified that another I/O device needs to access the system bus 12, and the device will not erroneously relinquish control of the bus in response to this false condition.

Figure 3:
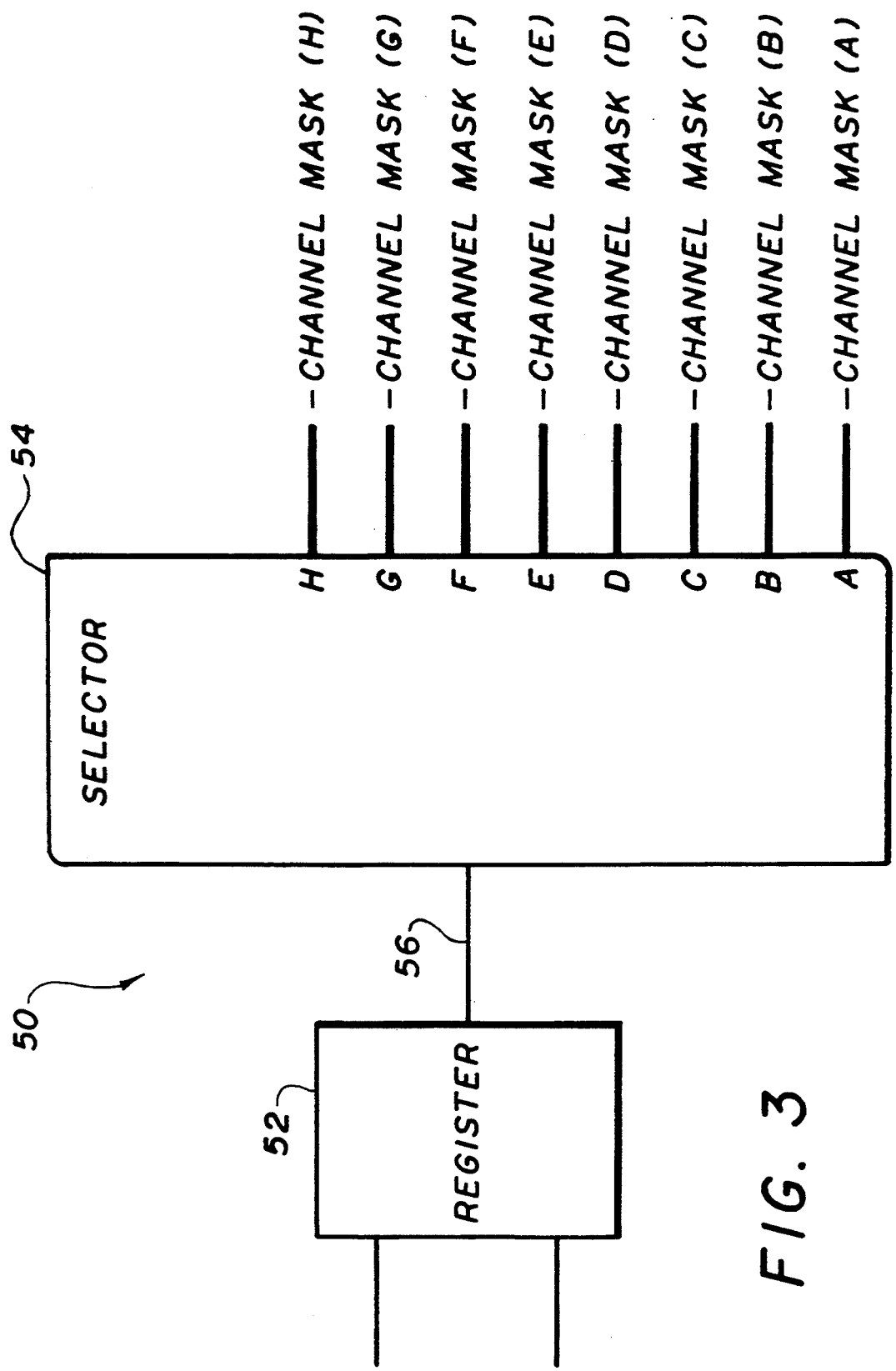
FIG. 3 is a circuit diagram used as an enabling mechanism for the circuit of FIG. 2.

The −CHANNEL MASK lines 44A–44H are static lines, and do not dynamically change state during real time operation of the system 10. For each I/O device 24A–24H in the system, the particular −CHANNEL MASK line 44A–44H to which the device is assigned is deactivated. A circuit 50 used to implement the above-described masking feature is shown in FIG. 3. The circuit 50 is implemented in the I/O device 24A–24H, and comprises a register 52 and a selector 54. The circuit 50 is a typical data register configuration, in which the output 56 of the register 52 is used to mask a selected logic channel 32A–32H for each of the I/O bus master devices 24–24H in the system. The output lines of the selector 54 correspond to the −CHANNEL MASK lines 44 of FIG. 2.

As previously explained, a PREEMPT signal 38 will result only when, for any given logic channel 32A–32H, the Q output 46 of flip-flop 48 is driven active high, in addition to the +DMAREQUEST line 40 and the −CHANNEL MASK line 44 being high. Referring back to FIG. 2, the structure of the flip-flop 48 is shown. The D input 58 of the flip-flop 48 is tied to a logic "1", or high, signal. The reset input 60 is an active high pulse which is activated upon initial power-up of the system 10. Upon resetting the flip-flops 48A–48H in the system, a PREEMPT signal is initially prevented because all of the Q outputs 46 are initially reset low. The Q output 46 for a particular flip-flop 48 is subsequently driven high upon activation of a −DMA ACKNOWLEDGE line 62, which issues in response to the activation of a +DMA REQUEST line. The −DMA ACKNOWLEDGE line serves as the clock signal for the flip-flop 48, thereby permitting a PREEMPT condition, as long as the other two inputs to the AND gate 42 are high.

Figure 4A:
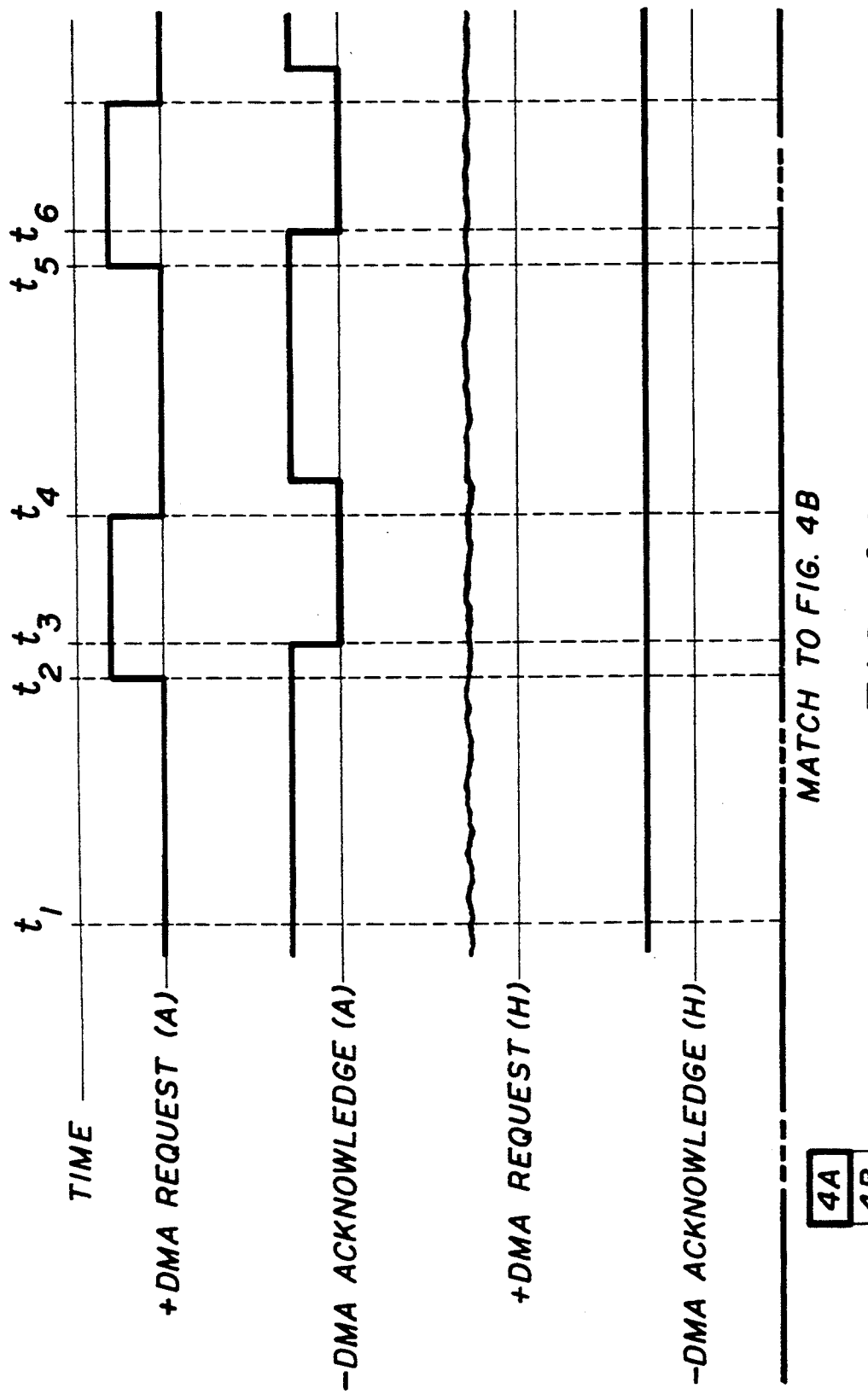
FIG. 4 is a timing diagram illustrating the operation of the circuit diagram of FIG. 2.
Figure 4B:
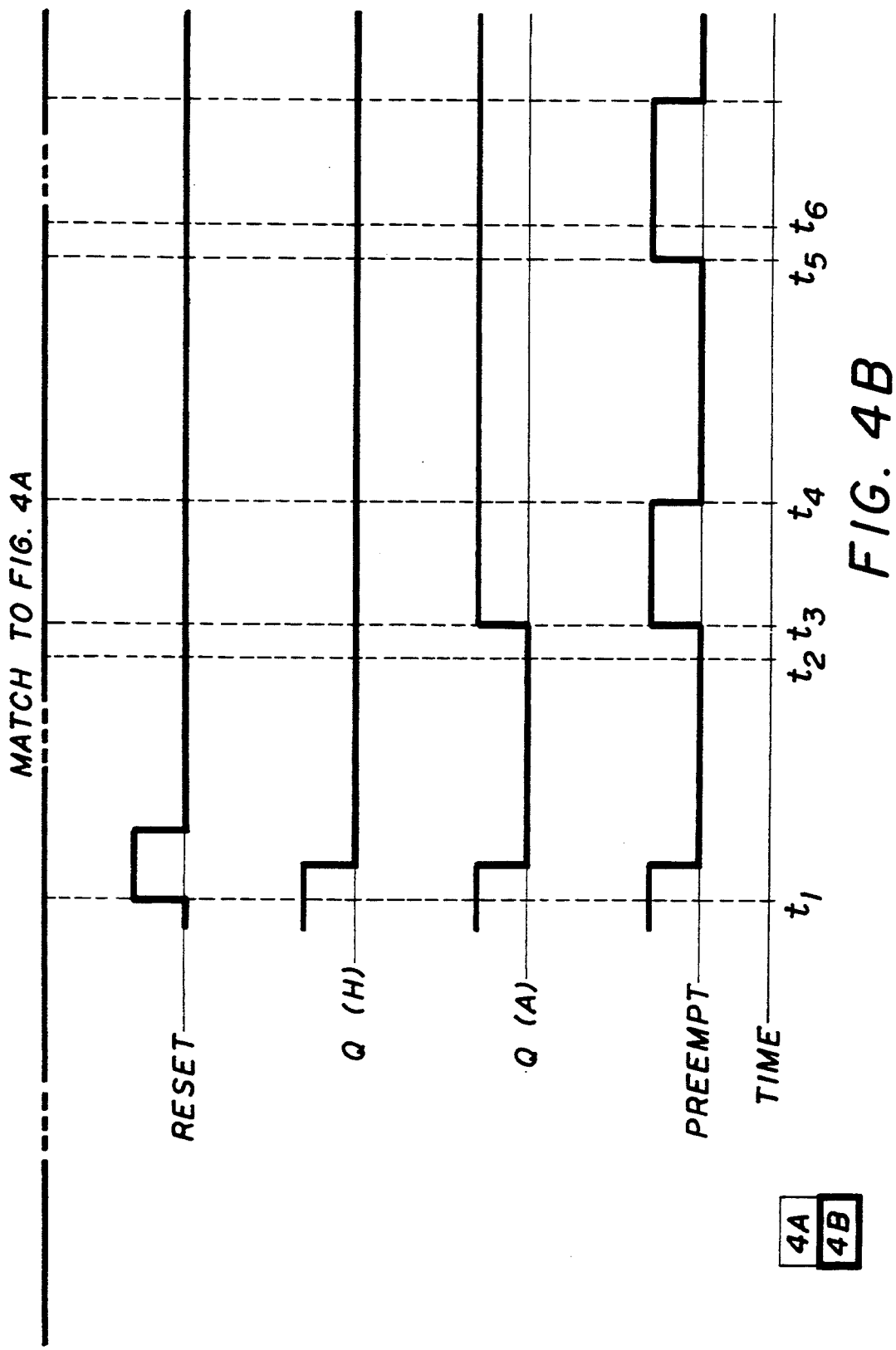

A timing diagram illustrating the operation of the control logic 30 of the present invention is shown in FIG. 4. This timing diagram shows how the control logic 30 differentiates between a +DMA REQUEST line which has been driven high by an I/O device and one which has merely floated to a logical high level. FIG. 4 corresponds to a system configuration in which an I/O bus master device 24A resides on channel A and no device resides on channel H. The +DMA REQUEST(H) line has floated to a logical high level, indicating a false request by channel H for access to the system bus.

At time $t_1$, the system is reset, as is done upon power-up. The Q outputs 46 of all of the flip-flops 48 are driven low, preventing the occurrence of a PREEMPT condition. At time $t_2$, the I/O device on channel A requests access to the system bus, driving +DMA REQUEST(A) line high. Because the DMA controller 22 will only acknowledge requests from active I/O devices, monitoring the −DMA ACKNOWLEDGE lines will indicate which request signals are actually being driven by the I/O devices.

Although the DMA controller 22 is programmed to recognize the channels on which devices are located and not those on which no devices are located, a PREEMPT signal cannot issue merely upon the first occurrence of a high +DMA REQUEST(A) line because there is no way to differentiate between the +DMAREQUEST(A) line which has been driven high and the +DMA REQUEST(H) line which has floated high. Thus, the PREEMPT signal will not issue until time $t_3$ when the DMA controller 22 acknowledges the existence of a device on channel A and drives −DMA ACKNOWLEDGE(A) low, thereby clocking the flip-flop 48A, driving its Q output 46A high, and resulting in a PREEMPT signal. This sequence of events is of course dependent on the −CHANNEL MASK(A) input being inactive (high). The PREEMPT signal will remain active until the +DMA REQUEST(A) line 40A is driven inactive by the device on channel A, shown as time $t_4$.

During the next +DMA REQUEST(A), which occurs at time $t_5$ in the timing diagram of FIG. 4, the device on channel A again drives the +DMA REQUEST(A) line high, resulting in the −DMA ACKNOWLEDGE(A) to go active low. Because the Q output of flip-flop 48A is already high, however, having been set by the first −DMA ACKNOWLEDGE(A) signal, the PREEMPT signal immediately goes high. The PREEMPT signal does not wait until time $t_6$ for the −DMA ACKNOWLEDGE(A) to go low to become active. Thereafter, all subsequent active +DMA REQUESTS are monitored, and PREEMPT signals issue in response thereto. An active +DMAREQUEST line is defined as any channel which has had its −DMA ACKNOWLEDGE signal driven active low since the occurrence of the last channel reset.

The response of the I/O device to the PREEMPT signal depends on the manner in which the I/O device is programmed. For example, the I/O device may respond by immediately relinquishing the system bus 12, or may alternatively respond by maintaining control of the system bus for a predetermined time before relinquishing control.

Although the invention described above may be implemented on any I/O device which is provided with a coprocessor which is capable of controlling the system bus 12, particular applications are contemplated on graphics cards which are either plugged into the I/O bus 16 or are implemented as a chip configuration which resides on the I/O bus. Such graphics cards have their own video RAM (VRAM) and a coprocessor which accesses this VRAM or the system memory 20. Some operations require that a video driver be able to write to (draw pictures into) system memory as well as video memory. Drawing into system memory improves video performance because a figure that is put on a computer screen multiple times may be drawn once into system memory and then copied onto the screen by a block transfer which is faster than draw operations. Access to system memory is completed over the local processor bus 14, while access to the VRAM is accomplished over the I/O bus.

Accordingly, the preferred embodiment of a system for controlling access to a system bus in a computer system has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

I claim:

1. A computer system, comprising:
   system memory and a memory controller for controlling access thereto;
   a central processing unit;
   at least a first and a second input/output device, each having a coprocessor incorporated therein;
   a system bus for electrically connecting said system memory, said memory controller, said central processing unit and said at least first and second input/output devices, control of which bus may be requested and thereafter taken by any one of said memory controller, said central processing unit and said input/output devices when communicating over said bus with each other or with system memory;
   said at least first and second input/output devices having control logic incorporated therein, said control logic incorporated into said first input/output device for (i) determining when said second input/output device requests control of said bus, (ii) outputting a preemption signal in response to said second input/output device request and (iii) relinquishing control of said bus by said first input/output device in response to said preemption signal, said control logic including preventative circuitry which is activated to output a mask signal to prevent a preemption signal from being outputted as a result of a request for control of said bus by said first input/output device, when said first input/output device already maintains control of said bus.

2. The computer system of claim 1, wherein said preventive circuitry includes a register for outputting said mask signal.

3. The computer system of claim 1, wherein said first or second input/output device requests control of said bus by actively driving a request line on said memory controller, and wherein an acknowledge signal which is driven active by said memory controller in response thereto is used as an input to said control logic.

4. The computer system of claim 3, further comprising differentiation circuitry for distinguishing between (i) a request line which has been actively driven high by a request by said first or second input/output device or (ii) a request line which has floated to a falsely indicative logical high level.

5. The computer system of claim 3, wherein said request line and said acknowledge signal are monitored by said memory controller, and wherein said control logic outputs (i) a first preemption signal upon detection of a first acknowledge signal and (ii) a subsequent preemption signal upon detection of an actively driven request line.

6. The computer system of claim 4, wherein said differentiation circuitry includes a flip-flop which is reset upon initial power-up of the system and which is clocked by said acknowledge signal in response to said request by said first or second input/output device.

7. The computer system of claim 3, wherein at least one of said first and second input/output devices is a video random access memory device.

8. A method of controlling access to a computer system bus on which resides system memory, a memory controller, a central processing unit, and at least first and second input/output devices each having a coprocessor incorporated therein, any one of which may control the system bus, said method comprising the steps of:
   (i) determining when said second input/output device requests control of said bus;
   (ii) outputting a preemption signal in response to said second input/output device request;
   (iii) relinquishing control of said bus by said first input/output device in response to said preemption signal; and
   (iv) outputting a mask signal to prevent a preemption signal from being outputted as a result of a request for control of said bus by said first input/output device, when said first input/output device already maintains control of said bus.

9. The method of claim 8, wherein said first or second input/output device requests control of said bus by actively driving a request line on said memory controller, and wherein an acknowledge signal is driven active by said memory controller in response thereto.

10. The method of claim 9, further comprising the step of differentiating between (i) a request line which has been actively driven high by a request by said first or second input/output device or (ii) a request line which has floated to a falsely indicative logical high level.

11. The method of claim 9, further comprising the steps of:
    outputting with said memory controller an acknowledge signal upon recognition of a request line which has been actively driven by a request from said second input/output device;
    monitoring said request line and said acknowledge signal; and
    outputting (i) a first preemption signal upon detection of a first acknowledge signal and (ii) a subsequent preemption signal upon detection of an actively driven request line.

12. The method of claim 10, wherein said step of differentiating is accomplished using a flip-flop which is reset upon initial power-up of the system and which is clocked by said acknowledge signal in response to said request by said first or second input/output device.

13. The computer system of claim 10, wherein at least one of said first and second input/output devices is a video random access memory device.

14. An I/O device including a coprocessor for installation in a computer system bus which electrically connects the I/O device to a central processing unit, a system memory, a memory controller, and at least a second I/O device including a coprocessor, control of which bus may be taken by any one of the memory controller, the central processing unit, and the first or second I/O devices when communicating over the bus with each other or with system memory; the first I/O device including:

control logic incorporated therein for (i) determining when the second input/output device requests control of the bus, (ii) outputting a preemption signal in response to the second input/output device request and (iii) relinquishing control of the bus by the first input/output device in response to said preemption signal, said control logic including preventative circuitry which is activated to output a mask signal to prevent a preemption signal from being outputted as a result of a request for control of the bus by the first input/output device, when the first input/output device already maintains control of the bus.

15. The computer system of claim 14, wherein said preventive circuitry includes a register for outputting said mask signal.

16. The computer system of claim 14, wherein said first or second input/output device requests control of the bus by actively driving a request line on the memory controller, and wherein an acknowledge signal which is driven active by the memory controller in response thereto is used as an input to said control logic.

17. The computer system of claim 16, further comprising differentiation circuitry for distinguishing between (i) a request line which has been actively driven high by a request by said first or second input/output device or (ii) a request line which has floated to a falsely indicative logical high level.

18. The computer system of claim 17, wherein the request line and the acknowledge signal are monitored by the memory controller, and wherein said control logic outputs (i) a first preemption signal upon detection of a first acknowledge signal and (ii) a subsequent preemption signal upon detection of an actively driven request line.

19. The computer system of claim 17, wherein said differentiation circuitry includes a flip-flop which is reset upon initial power-up of the system and which is clocked by the acknowledge signal in response to said request by said first or second input/output device.

20. The computer system of claim 14, wherein said first input/output device is a video random access memory device.

* * * * *